US012562110B1

(12) United States Patent
Guan et al.

(10) Patent No.: US 12,562,110 B1
(45) Date of Patent: Feb. 24, 2026

(54) DISPLAY CROSSTALK COMPENSATION BASED ON CROSSTALK CONTEXT

(71) Applicant: Apple Inc., Cupertino, CA (US)

(72) Inventors: Ximeng Guan, San Jose, CA (US); Dustin Y Wai, Sunnyvale, CA (US); Yu-Ching Yeh, Sunnyvale, CA (US); Yang Li, San Jose, CA (US); Jesun Kim, Cupertino, CA (US); Sheng Zhang, Saratoga, CA (US); Pubudu Galwaduge, Sunnyvale, CA (US); Jie Won Ryu, San Jose, CA (US); Hyunwoo Nho, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/959,153

(22) Filed: Nov. 25, 2024

Related U.S. Application Data

(60) Provisional application No. 63/574,649, filed on Apr. 4, 2024.

(51) Int. Cl.
*G09G 3/20* (2006.01)
*G09G 3/32* (2016.01)
*G09G 3/3225* (2016.01)

(52) U.S. Cl.
CPC ............. *G09G 3/3225* (2013.01); *G09G 3/32* (2013.01); *G09G 2310/08* (2013.01); *G09G 2320/0209* (2013.01)

(58) Field of Classification Search
CPC .... G09G 3/3225; G09G 3/32; G09G 2310/08; G09G 2320/0209
See application file for complete search history.

(56) References Cited

U.S. PATENT DOCUMENTS

| | | | | |
|---|---|---|---|---|
| 9,905,152 | B2 | 2/2018 | Sang | |
| 10,147,371 | B2 | 12/2018 | Sang et al. | |
| 11,004,400 | B2 | 5/2021 | Yoon et al. | |
| 11,205,363 | B2 | 12/2021 | Choi et al. | |
| 11,250,799 | B2 | 2/2022 | Shan | |
| 11,600,680 | B2 | 3/2023 | Kim et al. | |
| 12,020,649 | B2 | 6/2024 | Choi et al. | |
| 2018/0336854 | A1* | 11/2018 | Lin | G09G 3/3659 |
| 2019/0122337 | A1* | 4/2019 | Tang | G06T 5/90 |
| 2020/0265773 | A1* | 8/2020 | Fujii | G09G 5/10 |
| 2024/0282254 | A1* | 8/2024 | Lee | G09G 3/2003 |

FOREIGN PATENT DOCUMENTS

| | | | |
|---|---|---|---|
| CN | 101777329 | B | 12/2012 |
| CN | 110033728 | B | 10/2022 |
| CN | 118711496 | A | 9/2024 |
| JP | 2020192057 | A | 12/2020 |

* cited by examiner

*Primary Examiner* — Kwang-Su Yang

(74) *Attorney, Agent, or Firm* — Treyz Law Group, P.C.; Tianyi He

(57) ABSTRACT

An electronic device may include a display. The display have a shared data line display configuration in which pixels in a given row may be programmed with pixel values in different programming phases during a line time for the given row. Display driver circuitry for the display may include crosstalk compensation circuitry that performs crosstalk compensation for the pixel values based on the programming phases.

20 Claims, 7 Drawing Sheets

DISPLAY CROSSTALK COMPENSATION BASED ON CROSSTALK CONTEXT

This application claims the benefit of U.S. provisional patent application No. 63/574,649, filed Apr. 4, 2024, which is hereby incorporated by reference herein in its entirety.

FIELD

This relates generally to electronic devices and, more particularly, to electronic devices with displays.

BACKGROUND

Electronic devices often include displays that provide visual content to the viewers. A display can include an array of display pixels such as organic light-emitting diode display pixels or liquid crystal display pixels. Display driver circuitry coupled to the array of display pixels can control the operation of the array of display pixels.

SUMMARY

An electronic device may include a display. The display have a shared data line display configuration in which pixels in a given row may be programmed with pixel values in different programming phases during a line time for the given row. Display driver circuitry for the display may include crosstalk compensation circuitry that performs crosstalk compensation for the pixel values based on the programming phases.

In one illustrative arrangement, a display may include first and second pixels arranged in a same row of a pixel array. A data line may be coupled to the first and second pixels and may be coupled to display driver circuitry. The display driver circuitry may be configured to perform pixel value loading for the first pixel during a first programming phase using the data line and configured to perform pixel value loading for the second pixel during a second programming phase using the data line. The display driver circuitry may include crosstalk compensation circuitry that performs crosstalk compensation for a pixel value for the first pixel based on phase information indicative of the first programming phase.

In one illustrative arrangement, display pixel crosstalk compensation circuitry may include a selection circuit that receives a plurality of values each based on a corresponding crosstalk context and that receives display pixel programming phase information for a pixel voltage value based on which a given value of the plurality of values is selected for output from the selection circuit. The display pixel crosstalk compensation circuitry may further includes a crosstalk compensation lookup table coupled to the selection circuit and that receives the pixel voltage value and the selected given value and obtains a crosstalk compensation value for the pixel voltage value based on the pixel voltage value and the given value.

In one illustrative arrangement, crosstalk compensation circuitry may include a voltage-to-loading-weight lookup table configured to transform input display pixel voltage values into gate line loading weight values, may include an averaging circuit coupled to the voltage-to-loading-weight lookup table and configured to a plurality of average loading weight values, may include a multiplexer circuit having data inputs coupled to the averaging circuit, may include a phase tagging circuit coupled to a control input of the multiplexer circuit, and may include a compensation lookup table coupled to the multiplexer circuit and configured to transform a given one of the input display pixel voltages values and a given one of the plurality of average weight values into a compensation value for the given one of the input display pixel voltage values.

DETAILED DESCRIPTION

Figure 1:
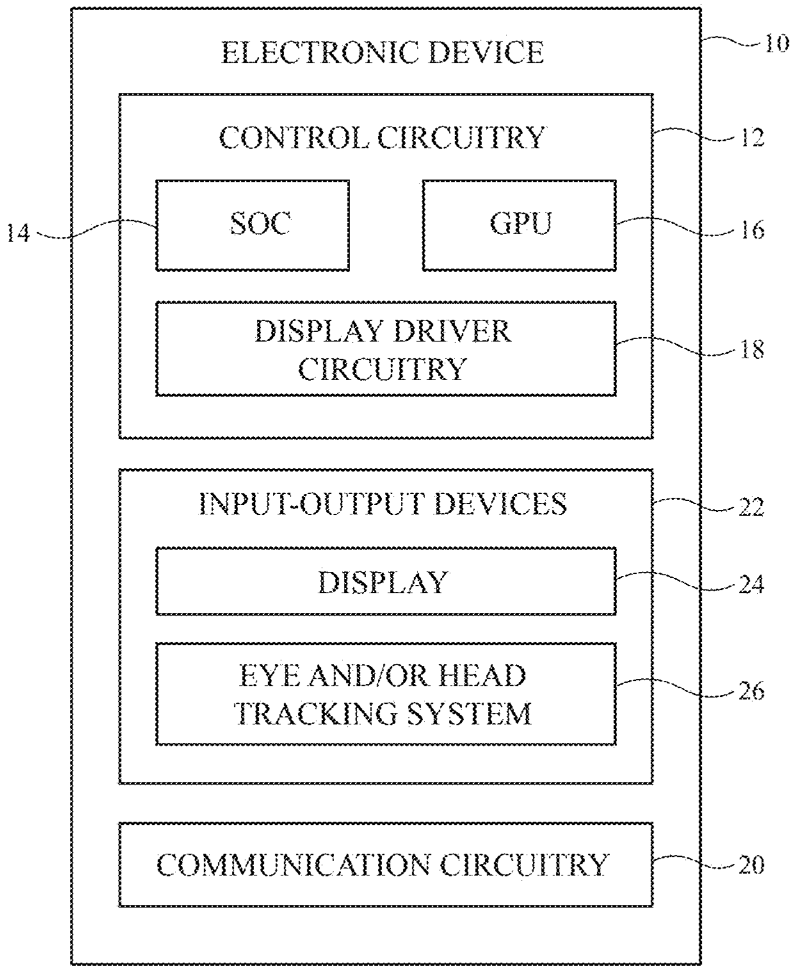
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment.

As shown in FIG. 1, electronic device 10 may have control circuitry 12. Control circuitry 12 may be configured to perform operations in electronic device 10 using hardware (e.g., dedicated hardware or circuitry), firmware and/or software. Software code for performing operations in electronic device 10 and other data is stored on non-transitory computer-readable storage media (e.g., tangible computer-readable storage media) in control circuitry 12. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives and/or solid-state drives), one or more removable flash drives or other removable media, or the like. Memory may also include volatile memory such as random-access memory (e.g., dynamic random-access memory and/or static random-access memory). Software stored on the non-transitory computer readable storage media may be executed on the processing circuitry of control circuitry 12. The processing circuitry may include application-specific integrated circuits with processing circuitry, one or more microprocessors, digital signal processors, graphics processing units, a central processing unit (CPU), or other processing circuitry.

In the example of FIG. 1, control circuitry 12 may include system circuitry 14 (sometimes referred to as system-on-chip (SOC) 14) that integrates one or more microprocessors, multi-core processors, microcontrollers, application-specific integrated circuits, and/or other types of processing circuitry for control circuitry 12. Control circuitry 12 may also include one or more graphics processing units (GPUs) 16 and display driver circuitry 18. Display driver circuitry 18 may include one or more integrated circuits (e.g., display driver integrated circuits) that implement thin-film transistor driving circuits, data programming or loading circuits, timing controller(s), and/or other suitable circuitry for operating display components such as display pixels in a display.

To support communications between device 10 and external equipment, control circuitry 12 may communicate using communication circuitry 20. Communication circuitry 20 may include antennas, radio-frequency transceiver circuitry, radios, and other wireless communication circuitry and/or wired communication circuitry. In some illustrative configurations, portions of communication circuitry 20 (e.g., radios or baseband processors) may be implemented or included as part of the processing circuitry of control circuitry 12.

Communication circuitry 20 may support unidirectional and/or bidirectional wireless communication between device 10 and external equipment over one or more wireless links. As examples, communication circuitry 20 may include wireless communication circuitry that supports communication over wireless personal area network link(s) (e.g., a Bluetooth® link), that supports communication over wireless local area network link(s) (e.g., a WiFi® link), supports communication over a near-field communication link, supports communication over a cellular network link (e.g., a 60 GHz link or other millimeter wave link and/or other cellular network links using other radio-frequency bands), and/or supports communications over any other suitable wired or wireless communications link.

Device 10 may, if desired, include power circuits for transmitting and/or receiving wired and/or wireless power and may include batteries or other energy storage devices. For example, device 10 may include a coil and rectifier circuitry that uses the coil to receive wireless power provided to components (e.g., energy storage devices, control circuitry 12, etc.) in device 10.

Input-output circuitry in device 10 such as input-output devices 22 may be used to receive input (e.g., captured images, user voice or other sound input, user haptic or other force input, etc.) supplied to device 10 and/or to provide output (e.g., visual content such as images and/or videos, sound, haptic output, etc.) from device 10 to the external environment (e.g., to users and/or external equipment). In particular, a user can control the operation of device 10 by supplying commands through input-output devices 22 and may receive status information and other output from device 10 using input-output devices 22. As examples, input-output devices 22 may include buttons, joysticks, scrolling wheels, touch pads, key pads, keyboards, microphones, speakers, tone generators, vibrators, cameras, sensors, light-emitting diodes and other status indicators, data ports, and other electrical components.

Additionally, input-output devices 22 may include one or more displays such as display 24. Display 24 may be a touch screen display that includes a touch sensor for gathering touch input from a user or display 24 may be insensitive to touch. A touch sensor for display 24 may be based on an array of capacitive touch sensor electrodes, acoustic touch sensor structures, resistive touch components, force-based touch sensor structures, a light-based touch sensor, or other suitable touch sensor arrangements.

Some types of electronic device 10 may include two displays 24. In one possible arrangement, a first display 24 may be positioned on one side of device 10 and a second display 24 may be positioned on a second, opposing side of device 10. First and second displays 24 therefore may have a back-to-back arrangement, thereby providing visual content in opposite directions (e.g., to different users). One or both of displays 24 may be curved.

Sensors in input-output devices 22 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 24, a two-dimensional capacitive touch sensor overlapping display 24, and/or a touch sensor that forms a button, trackpad, or other input device not associated with a display), and other sensors. If desired, sensors in input-output devices 22 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors.

Device 10 may include cameras and other components that form part of gaze and/or head tracking system 26. The camera(s) or other components of system 26 may face an expected location for a viewer and may track the viewer's eyes and/or head (e.g., images and other information captured by system 26 may be analyzed by control circuitry 12 to determine the location of the viewer's eyes and/or head). This head-location information obtained by system 26 may be used to determine the appropriate direction with which display content from display 24 should be directed. Eye and/or head tracking system 26 may include any desired number and combination of infrared and/or visible light detectors. Eye and/or head tracking system 26 may optionally include light emitters to illuminate the scene.

Control circuitry 12 may be used to run software on device 10 such as operating system code and applications. During operation of device 10, the software running on control circuitry 12 may display images on display 24 using an array of pixels in display 24.

Display 24 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 24 is an organic light-emitting diode display are sometimes described herein as an example.

Display 24 may have a rectangular shape (i.e., display 24 may have a rectangular footprint and a rectangular peripheral edge that runs around the rectangular footprint) or may have other suitable shapes. Display 24 may be planar or may have a curved profile.

Display 24 may sometimes be a stereoscopic display that is configured to display three-dimensional content for a viewer. Stereoscopic displays are capable of displaying multiple two-dimensional images that are visible from slightly different angles. When viewed together, the combination of the two-dimensional images creates the illusion of a three-dimensional image for the viewer. For example, a viewer's left eye may receive a first two-dimensional image and a viewer's right eye may receive a second (different) two-dimensional image. The viewer perceives these two different two-dimensional images as a single three-dimensional image.

There are numerous ways to implement a stereoscopic display. Display 24 may be a lenticular display that uses lenticular lenses (e.g., elongated lenses that extend along parallel axes), may be a parallax barrier display that uses parallax barriers (e.g., an opaque layer with precisely spaced slits to create a sense of depth through parallax), may be a volumetric display, or may be any other desired type of stereoscopic display. Configurations in which display 24 is a lenticular display are sometimes described herein as an example.

Figure 2:
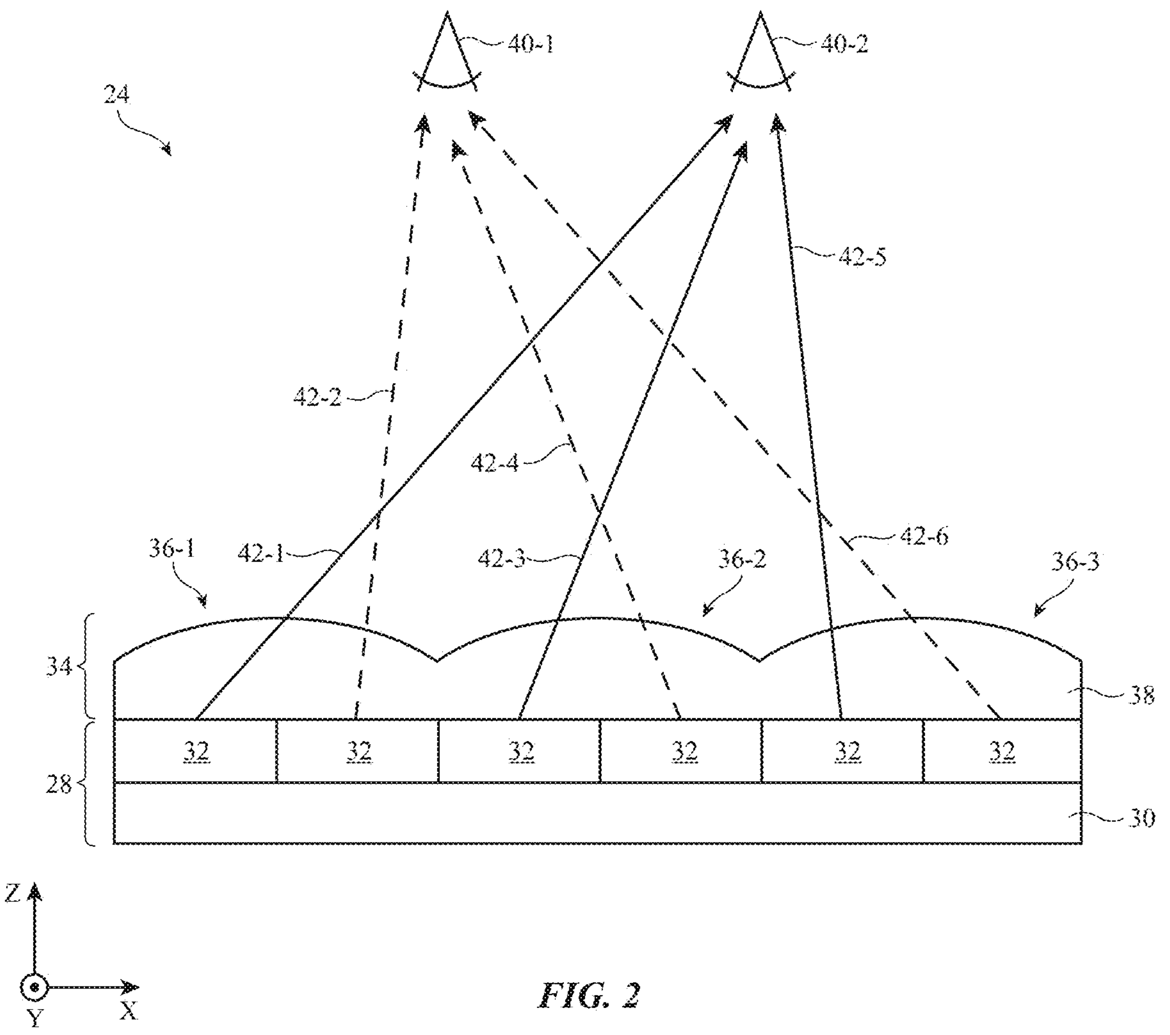
FIG. 2 is a cross-sectional side view of an illustrative display that provides images to a viewer in accordance with some embodiments.

FIG. 2 is a cross-sectional side view of an illustrative lenticular display that may be incorporated into electronic device 10. Display 24 includes a display panel 28 with pixels 32 on substrate 30. Substrate 30 may be formed from glass, metal, plastic, ceramic, and/or other substrate materials and pixels 32 may be organic light-emitting diode pixels, liquid crystal display pixels, or any other desired type of pixels.

As shown in FIG. 2, lenticular lens film 34 may be formed over display pixels 32. Lenticular lens film 34 (sometimes referred to as a light redirecting film, a lens film, etc.) includes lenses 36 and a base film portion 38 (e.g., a planar film portion to which lenses 36 are attached). Lenses 36 may be lenticular lenses that extend along respective longitudinal axes (e.g., axes that extend into the page parallel to the Y-axis). Lenses 36 may be referred to as lenticular elements 36, lenticular lenses 36, optical elements 36, etc.

Figure 3:
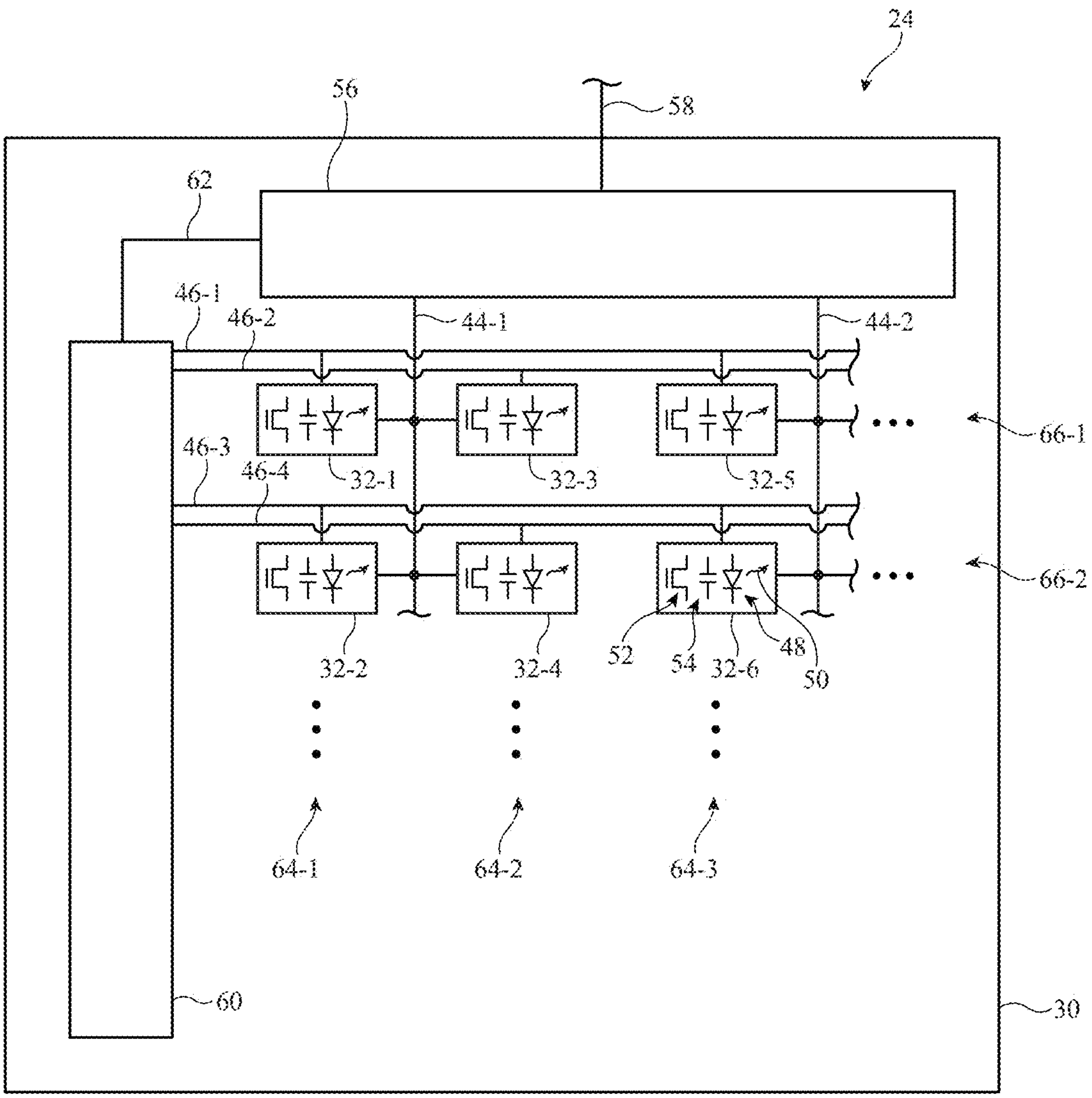
FIG. 3 is a top view of an illustrative display having display driver circuitry in accordance with some embodiments.

Lenses 36 of lenticular lens film 42 cover pixels 32 of display 24. An illustrative configuration is shown in FIG. 3. In this illustrative configuration, two display pixels 32 are covered by a first lenticular lens 36-1, two display pixels 32 are covered by a second lenticular lens 36-2, and two display pixels 32 are covered by a third lenticular lens 36-3. Lenticular lenses 36-1, 36-2, and 36-3 may redirect light from corresponding pairs of covered display pixels 32 to enable stereoscopic viewing of display 24.

Consider the example of display 24 being viewed by a viewer with a first eye 40-1 (e.g., a right eye) and a second eye 40-2 (e.g., a left eye). Light from a first pixel 32 under lens 36-1 is directed by lenticular lens film 34 in direction 42-1 towards eye 40-2, light from a second pixel 32 under lens 36-1 is directed by lenticular lens film 34 in direction 42-2 towards eye 40-1, light from a first pixel 32 under lens 36-2 is directed by lenticular lens film 34 in direction 42-3 towards eye 40-2, light from a second pixel 32 under lens 36-2 is directed by lenticular lens film 34 in direction 42-4 towards eye 40-1, light from a first pixel 32 under lens 36-3 is directed by lenticular lens film 34 in direction 42-5 towards eye 40-2, and light from a second pixel 32 under lens 36-3 is directed by lenticular lens film 34 in direction 42-6 towards eye 40-1. In this way, the viewer's eye 40-1 receives images from second pixels 32 under lenses 36-1, 36-2, and 36-3, whereas the viewer's eye 40-2 receives images from first pixels 32 under lenses 36-1, 36-2, and 36-3. The first pixels 32 may be used to display a slightly different image than the second pixels 32. Consequently, the viewer may perceive the received images as a single three-dimensional image.

Pixels of the same color may be covered by a respective lenticular lens 36. In one example, first and second pixels 32 under lens 36-1 may be red pixels that emit red light, first and second pixels 32 under lens 36-2 may be green pixels that emit green light, and first and second pixels 32 under lens 36-2 may be blue pixels that emit blue light. This example is merely illustrative. In general, each lenticular lens 36 may cover any desired number of pixels each having any desired color. In other words, lenticular lens 36 may cover a plurality of pixels of the same color, may cover a plurality of pixels each of different colors, may cover a plurality of pixels with some pixels of the same color and some pixels of different colors, etc.

Configurations in which display 24 is a lenticular display are described herein as an illustrative example. If desired, display 24 may be another type of stereoscopic display (e.g., that produces three-dimensional images) or may be a two-dimensional display that produces two-dimensional images.

A top view of a portion of display 24 is shown in FIG. 3. As shown in FIG. 3, display 24 may have an array of display pixels 32 formed on substrate 30. Substrate 30 may be formed from glass, metal, plastic, ceramic, and/or other substrate materials. Pixels 32 may receive data signals (e.g., pixel values or pixel voltage values) over signal paths such as data lines 44 and may receive one or more control signals over control signal paths such as control lines 46 (sometimes referred to as gate lines) which can include scan lines, emission control lines, etc. There may be any suitable number of rows and columns of pixels 32 in display 14 (e.g., tens or more, hundreds or more, or thousands or more). Each pixel 32 may have a light-emitting diode 48 that emits light 50 under the control of a pixel circuit formed from thin-film transistor circuitry such as thin-film transistors 52 and thin-film capacitor(s) 54. Thin-film transistors 52 may be polysilicon thin-film transistors, semiconducting-oxide thin-film transistors such as indium gallium zinc oxide transistors, or thin-film transistors formed from other semiconductors. Pixels 32 may contain light-emitting diodes of different colors (e.g., red, green, and blue diodes for red, green, and blue pixels, respectively) to provide display 24 with the ability to display color images. In some contexts, a group of pixels 32 (e.g., of different colors) may be individually referred to as sub-pixels 32 of the group and the group of (sub-) pixels 32 may be collectively referred to as a pixel.

Display driver circuitry may be used to control the operation of pixels 32. The display driver circuitry may be formed from one or more integrated circuits that implement thin-film transistor driving circuits, data programming or loading circuits, timing controller(s), and/or other suitable circuitry. Display driver circuitry 56 of FIG. 2 may contain communications and/or interface circuitry for communicating with system control circuitry such as control circuitry 12 of FIG. 1 over path 58. Path 58 may be formed from traces on a flexible printed circuit or other cable. During operation, the system control circuitry (e.g., control circuitry 12 of FIG. 1) may supply circuitry 56 with information on images to be displayed on display 24. For example, circuitry 56 may receive image data based on which pixel voltage values for displaying the images can be obtained and conveyed to pixels 32.

To display the images on display pixels 32, display driver circuitry 56 may supply pixel voltage values to data lines 44 while issuing clock signals and other control signals for supporting gate driver circuitry such as gate driver circuitry 60 over path 62. If desired, display driver circuitry 56 may also supply clock signals and other control signals to gate driver circuitry on an edge of display 24 opposite the edge of display 24 on which gate driver circuitry 60 shown in FIG. 3 is disposed (e.g., in a double-sided gate driving scheme).

Gate driver circuitry 60 (sometimes referred to as horizontal control line control circuitry) may be implemented as part of an integrated circuit (e.g., forming part of the display driver circuitry) and/or may be implemented using thin-film transistor circuitry. Gate driver circuitry 60 and display driver circuitry 56 may sometimes be collectively referred to as being the display driver circuitry for display 24. Horizontal control lines 46 in display 24 may carry gate line signals such as scan line signals, emission enable control signals, and/or other horizontal control signals for controlling the pixels of each row. There may be any suitable number of horizontal control signals (and corresponding lines carrying these signals) per row of pixels 32 (e.g., one or more, two or more, three or more, four or more, etc.).

In some display configurations, each data line 44 may be shared by (e.g., provide pixel voltage values to) multiple columns of pixels 32. In the example of FIG. 3, data line 44-1 is coupled to pixels in column 64-1 of the pixel array (e.g., pixels 32-1 and 32-2) and pixels in column 64-2 of the pixel array (e.g., pixels 32-3 and 32-4). Similarly, data line 44-2 is coupled to pixels in column 64-3 of the pixel array (e.g., pixels 32-5 and 32-6) and pixels in yet another column of the pixel array.

During a data programming time period (sometimes referred to as a data loading time period), display driver circuitry 56 may supply image data to pixels 32 in different columns sharing a given data line at different times (e.g., in different phases) in conjunction with assertions of corresponding gate signals supplied using different gate lines 46 for the same row. In the example of FIG. 3, gate driver circuitry 60 may supply gate signal(s) on one or more gate lines such as gate line 46-1 that are coupled to and control the state of data loading transistor(s) 52 in a first set of pixels in row 66-1 of the pixel array (e.g., pixels in odd-numbered columns 64 and in row 66-1) and may supply gate signal(s) on one or more gate lines such as gate line 46-2 that are coupled to and control the state of data loading transistor(s) 52 in a second set of pixels in row 66-1 (e.g., pixels in even-numbered columns 64 and in row 66-1). Similarly, gate driver circuitry 60 may supply gate signal(s) on one or more gate lines such as gate line 46-3 that are coupled to and control the state of data loading transistor(s) 52 in a first set of pixels in row 66-2 of the pixel array (e.g., pixels in odd-numbered columns 64 and in row 66-2) and may supply gate signal(s) on one or more gate lines such as gate line 46-4 that are coupled to and control the state of data loading transistor(s) 52 in a second set of pixels in row 66-2 (e.g., pixels in even-numbered columns 64 and in row 66-2).

Figure 4:
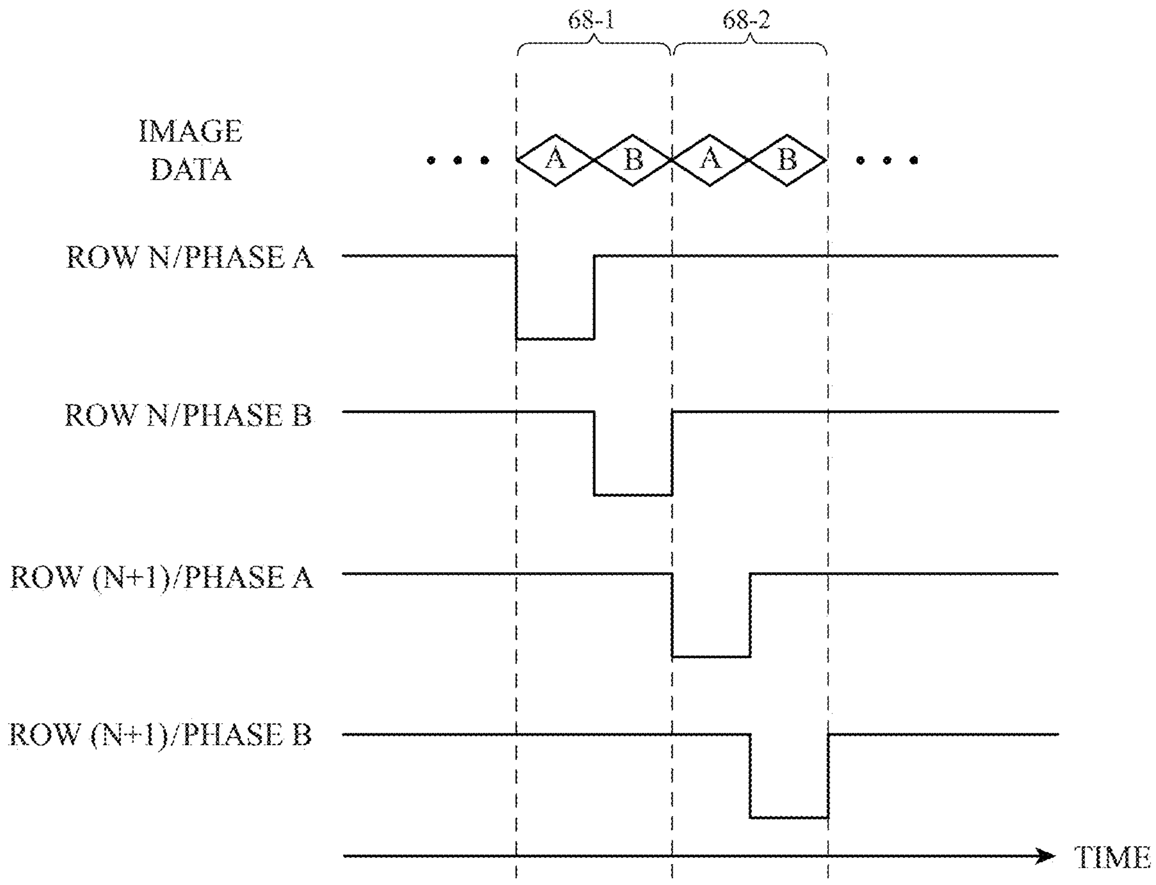
FIG. 4 is an illustrative timing diagram for pixel value programming into display pixels in accordance with some embodiments.

FIG. 4 is an illustrative timing diagram for loading image data (e.g., pixel voltage values) into a portion of pixels in the pixel array, which is implemented with a shared data line display configuration such as the configuration described in connection with FIG. 3. Two illustrative line time periods 68-1 and 68-2 are shown in the example of FIG. 4 for loading pixel voltage values into pixels in two corresponding rows N and N+1. As one illustrative example, row N may be row 66-1 of FIG. 3 and row N+1 may be row 66-2 of FIG. 3.

A single data line (e.g., line 44-1 of FIG. 3) may provide the image data (e.g., pixel values to be conveyed to corresponding pixels) as depicted in FIG. 4. In a first portion (e.g., in phase A) of time period 68-1, a first gate line (e.g., gate line 46-1 of FIG. 3) may activate a corresponding transistor (e.g., transistor 52 in pixel 32-1 of FIG. 3) to load a pixel voltage value (for the image to be subsequently displayed) onto a pixel capacitor (e.g., capacitor 54 in pixel 32-1 of FIG. 3) based on a pixel voltage value on the data line during this phase of the time period. In a second portion (e.g., in phase B) of time period 68-1, a second gate line (e.g., gate line 46-2 of FIG. 3) may activate a corresponding transistor (e.g., transistor 52 in pixel 32-3 of FIG. 3) to load a pixel voltage value (for the image to be subsequently displayed) onto a pixel capacitor (e.g., capacitor 54 in pixel 32-3 of FIG. 3) based on a pixel voltage value on the data line during this phase of the time period.

In a first portion (e.g., in phase A) of time period 68-2, a third gate line (e.g., gate line 46-3 of FIG. 3) may activate a corresponding transistor (e.g., transistor 52 in pixel 32-2 of FIG. 3) to load a pixel voltage value (for the image to be subsequently displayed) onto a pixel capacitor (e.g., capacitor 54 in pixel 32-2 of FIG. 3) based on a pixel voltage value on the data line during this phase of the time period. In a second portion (e.g., in phase B) of time period 68-2, a fourth gate line (e.g., gate line 46-4 of FIG. 3) may activate a corresponding transistor (e.g., transistor 52 in pixel 32-4 of FIG. 3) to load an a pixel voltage value (for the image to be subsequently displayed) onto a pixel capacitor (e.g., capacitor 54 in pixel 32-4 of FIG. 3) based on a pixel voltage value on the data line during this phase of the time period.

The loading of image data from a single data line onto pixel in a portion of the pixel array is illustrated in FIG. 4. Image data (e.g., pixel voltage values) from other shared data lines may be loaded in a similar manner. In general, a first set of gate lines may each convey a control signal that facilitates pixel value loading into a first set of pixels during a first phase of the line time period for its respective pixel row and a second (different) set of gate lines may each convey a control signal that facilitates pixel value loading into a second (different) set of pixels during a second phase of the line time period for its respective pixel row. If desired, displays such display 24 may be configured with data lines that are each shared by pixels of more than two columns (e.g., by pixels in three columns, four columns, etc.) and may operate with a corresponding number of phases (e.g., three phases, four phases, etc.) for each line time period.

While displays that have shared data line schemes may exhibit desirable properties such as higher pixel density, larger aperture ratio, lower manufacturing costs, etc., these displays, without more, may also undesirably experience horizontal crosstalk between pixels in different columns and the same row during pixel value loading. In particular, this crosstalk may occur due to the variation in capacitive loads between different pixels and the gate line shared between the different pixels in the same row that are activated in the same phase. As an example described in connection with FIG. 3, pixel 32-5 (when being loaded with a darker image data value) may exert a higher capacitive load to gate line 46-1 and the increased gate line load may cause the pixel value being loaded into pixel 32-1 to shift in value. Accordingly, it may be desirable to compensate for this type of crosstalk and provide higher fidelity images.

While displays having column-specific (non-shared) data lines can exhibit a similar type of crosstalk and therefore perform corresponding crosstalk compensation, the crosstalk compensation performed by these displays may not be applicable to (e.g., may not accurately compensate for) the crosstalk exhibited by displays that have shared data line. In particular, the phase dependency of data programming (loading) for pixels in the same row and the independent use of phase-specific gate lines for the data programming should be accounted for to properly compensate for the crosstalk exhibited by displays that have shared data line.

Figure 5:
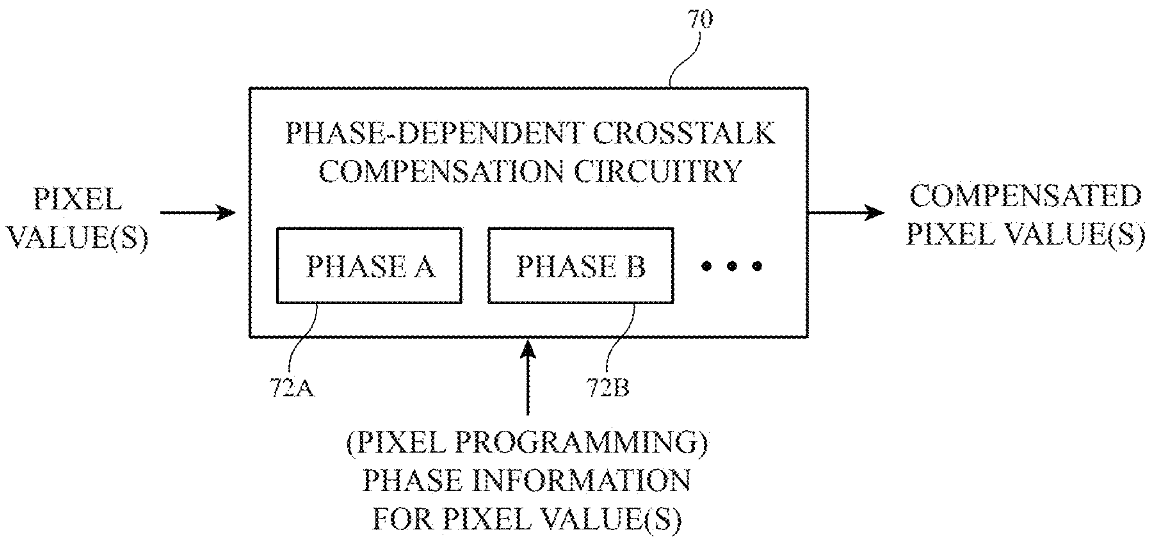
FIG. 5 is a diagram of illustrative pixel value compensation circuitry having modes based on different pixel programming phases in accordance with some embodiments.

FIG. 5 is a diagram of illustrative pixel value compensation circuitry such as pixel value compensation circuitry 70. Compensation circuitry 70 may be implemented as part of display driver circuitry 56 of FIG. 3 and/or elsewhere in the display pipeline that handle the processing of pixel values prior to being conveyed to the display pixels. Compensation circuitry 70 may obtain the pixel values prior to being processed by some portions of display driver circuitry 56 and/or after being processed by other portions of display circuitry 56.

Different pixel values obtained by compensation circuitry 70 may be associated with different data loading phases and the corresponding pixels receiving the pixels value may be subject to different gate line loading conditions or generally different crosstalk contexts. As an example referring to FIG. 3, during pixel value programming for pixel 32-1 (during which the signal on gate line 46-1 is asserted), pixels of row 66-1 in other odd-numbered columns 64 (e.g., pixel 32-5) coupled to gate line 46-1, and more specifically the pixel values to be loaded onto these pixels, may contribute to crosstalk context (e.g., the load experienced by gate line 46-1) impacting the programming of the pixel value for pixel 32-1. Because pixel value programming for pixel 32-3 of FIG. 3 and for other pixels of row 66-1 in even-numbered columns 64 occurs in a different phase than that for pixel 32-1, the pixel values for these other pixels in the same pixel row may be disregarded with respect to the compensation context (e.g., the load experienced by gate line 46-1) impacting the programming of the pixel value for pixel 32-1. In an analogous manner, during pixel value programming for pixel 32-3 (during which the signal on gate line 46-2 is asserted), pixels of row 66-1 in other even-numbered columns 64 coupled to gate line 46-2, and more specifically the pixel values to be loaded onto these pixels, may contribute to crosstalk context (e.g., the load experienced by gate line 46-2) impacting the programming of the pixel value for pixel 32-3.

Compensation circuitry 70 may discriminate or distinguish between the different suitable crosstalk contexts associated with pixel values for different pixels 32 (even when the pixels are in the same row) and apply different compensation settings to pixel values for different pixels 32 (based on their crosstalk contexts). Configurations in which the crosstalk context is based on the pixel programming phase for the pixel value (or generally the portion of line time during time the pixel value is loaded into the corresponding pixel) are sometimes described herein as an illustrative example. In these configurations, compensation circuitry 70 may be referred to as phase-dependent crosstalk compensation circuitry 70.

In the example of FIG. 5, compensation circuitry 70 may obtain pixel programming phase information for each received pixel value and process the received pixel value based on its pixel programming phase information. Each pixel value may be tagged or generally associated with the phase information by compensation circuitry 70. In particular, compensation circuitry 70 may perform crosstalk compensation for one or more received pixel values using a first compensation mode (e.g., using a first set of parameters, using a first set of components, placing a set of components in a first configuration, using a first compensation scheme, and/or generally in a first manner) such as mode 72A for pixel values being loaded in phase A (e.g., as described in connection with FIGS. 3 and 4). Compensation circuitry 70 may perform crosstalk compensation for one or more other received pixel values using a second compensation mode (e.g., using a second set of parameters, using a second set of components, placing the set of components in a second configuration, using a second compensation scheme, and/or generally in a second manner) such as mode 72B for pixel values being loaded in phase B (e.g., as described in connection with FIGS. 3 and 4). Compensation circuitry 70 may perform crosstalk compensation for additional sets of pixel values using additional components modes (e.g., in configurations in which pixel values are loaded in three or more phases in a given line time period). Compensation circuitry 70 may operate using multiple different compensation modes in parallel (e.g., when processing pixel values in a row-wise manner, values for some pixels in a given row may be processed using a first compensation mode while values for other pixels in the given row may be processed using a second compensation mode).

The pixel programming phase information may itself be the pixel programming phase for the pixel value or may include other information (e.g., pixel value metadata) indicative of the pixel programming phase for the pixel value. Based on the pixel programming phase information, compensation circuitry 70 may determine the compensation mode (e.g., one of modes 72A or 72B) for use. Using the appropriately determined compensation modes, compensation circuitry 70 may generate compensated pixel values based on their respective crosstalk contexts. The compensated pixel values may be programmed into corresponding pixels of display 24 (e.g., with or without additional downstream processing of the compensated pixel values) during respective phases on shared data lines and using corresponding gate lines (e.g., as described in connection with FIGS. 3 and 4).

Figure 6:
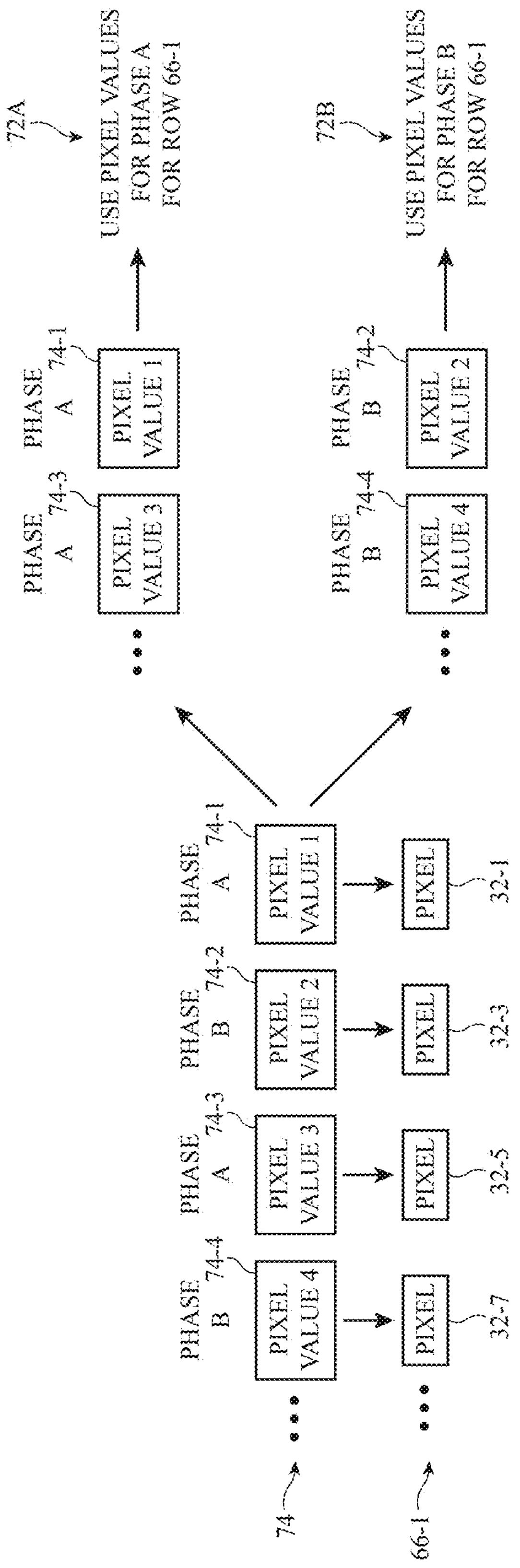
FIG. 6 is a schematic diagram of illustrative pixel value compensation circuitry in accordance with some embodiments.

An illustrative example of crosstalk contexts and corresponding compensation modes is shown in FIG. 6. In the example of FIG. 6, crosstalk compensation for pixels values 74 may be performed (e.g., by compensation circuitry 70 in FIG. 5). In this illustrative example, pixel values 74 may be for programming into corresponding pixels in the same pixel row (e.g., pixels 32-1, 32-3, 32-5, 32-7 in row 66-1 of FIG. 3).

Each pixel value 74 may be tagged or otherwise associated with a phase in which the pixel value is loaded, with pixel values for pixels sharing a data line being associated with different phases. In the example of FIG. 6, pixel values 74-1, 74-3, etc., may be associated with pixel programming phase A, whereas pixel values 74-2, 74-4, etc., may be associated with pixel programming phase B.

Based on the tagging or association between a pixel value and its programming phase, a first compensation mode may be applied when compensating for pixel values 74 associated with pixel programming phase A, and a second compensation mode may be applied when compensating for pixel values 74 associated with pixel programming phase B. In the example of FIG. 6, when compensating for each of pixel values 74-1, 74-3, etc., pixel values for the same pixel row loaded during the same programming phase A (e.g., an average gate line loading weight caused by these pixel values) may be used (e.g., by compensation circuitry 70 when performing crosstalk compensation using mode 72A). When compensating for each of pixel values 74-2, 74-4, etc., pixel values for the same pixel row loaded during the same programming phase B (e.g., an average gate line loading weight caused by these pixel values) may be used (e.g., by compensation circuitry 70 when performing crosstalk compensation using mode 72B).

The example of FIG. 6 describes how pixel values for a single pixel row can be processed (e.g., to compensate for crosstalk). In general, pixel values for other pixel rows may be processed in an analogous manner.

Figure 7:
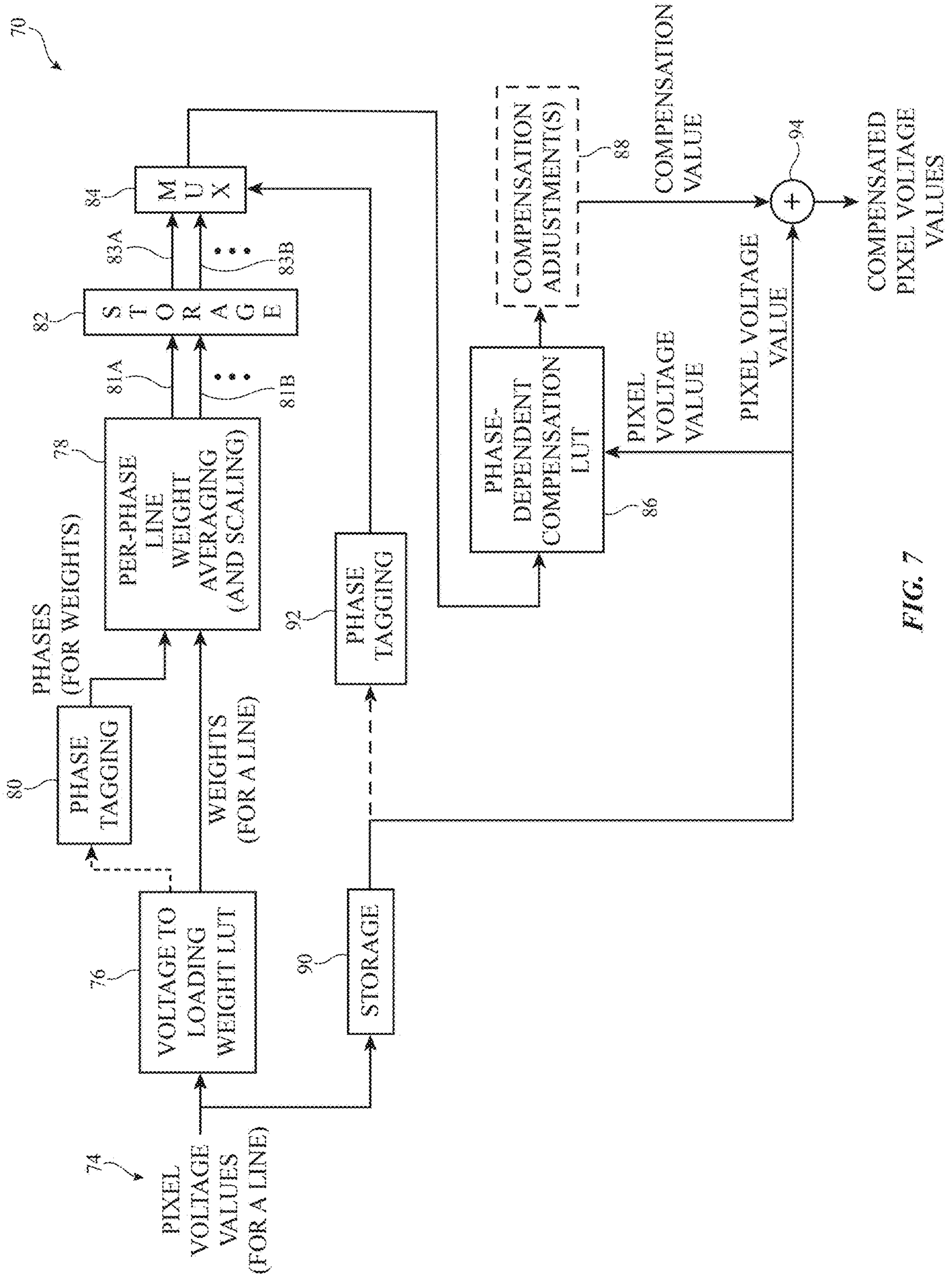
FIG. 7 is a flowchart of illustrative operations for performing crosstalk compensation for pixel values based on pixel programming phases in accordance with some embodiments.

An illustrative implementation of crosstalk compensation circuitry such as compensation circuitry 70 in FIG. 5 and/or for performing the operations described in connection with FIG. 6 is shown in FIG. 7. If desired, the crosstalk compensation circuitry may be implemented in other suitable manners.

In the example of FIG. 7, compensation circuitry 70 may include a lookup table (LUT) such as LUT 76 that transforms the input pixel voltage value 74 to a loading weight (value). Accordingly, LUT 76 may form or generally be referred to as a transformation or conversion circuit 76. The loading weight value may be indicative of the degree of capacitive loading on a gate line caused by the input voltage value. LUT 76 may receive and transform pixel values 74 to be loaded into a line of pixels (e.g., pixels in the entire row, pixels in a portion of the entire row, pixels in other arrangements in which crosstalk is expected, etc.).

Compensation circuitry 70 may include an averaging circuit 78 coupled to LUT 76 and configured to receive weights (converted from received pixel values) associated with the line of pixels. Averaging circuit 78 may perform averaging of weights for the line of pixels based on pixel programming phases associated with the corresponding pixel values and consequently the converted weights. Accordingly, averaging circuit 78 may be coupled to a phase tagging circuit 80 and obtain phases tagged to or otherwise associated with the received weights from circuit 80. Accordingly, averaging circuit 78 may average each set of weights associated with the same phase for the same line to obtain a set of per-phase average line weight values. As an example, a first set of weights (e.g., converted from pixel values 74-1, 74-3, etc., to be loaded in programming phase A as described in FIG. 6) may result in a phase A average weight value to be output on path 81A, a second set of weights (e.g., converted from pixel values 74-2, 74-4, etc., to be loaded in programming phase B as described in FIG. 6) may result in a phase B average weight value to be output on path 81B, and/or additional sets of weights may result in other average weight values (e.g., for other phases) to be output from averaging circuit 78.

Averaging circuit 78 may perform the averaging of weights for different phase in parallel (and/or sequentially) as suitable. If desired, one or more scaling circuits may be provided to scale (or generally adjust) the average weight values prior to being output on paths 81.

Because the per-phase averaging operation performed by averaging circuit 78 is performed for pixel values for each line (e.g., in a line-wise manner), compensation circuitry 70 may include a storage circuit 82 (e.g., register(s)) coupled to paths 81 to temporarily hold (store) the per-phase average weight values for a line time period (e.g., such that all per-phase average weight values for that line are generated).

Compensation circuitry 70 may include a selection circuit such as multiplexer circuit 84 coupled to paths 83 and configured to receive the per-phase average weight values on these paths 83 at data inputs of multiplexer circuit 84. Paths 83 may include path 83A providing a phase A average weight value (e.g., the value on path 81A), may include path 83B providing a phase B average weight value (e.g., the value on path 81B), and/or may include other paths providing additional average weight values (e.g., for other phases). Multiplexer circuit 84 may further include a control input coupled to and configured to receive indications of phases (for pixel values being processed by LUT 86) from phase tagging circuit 92. Phase tagging circuit 92 may be implemented using at least a portion of phase tagging circuit 80 or implemented separately from phase tagging circuit 80. Based on the phases provided by phase tagging circuit 92, multiplexer 84 may supply the appropriate input per-phase average weight value for passthrough and output by multiplexer 84.

LUT 86 in compensation circuitry 70 may be a two-dimensional LUT that receives a pixel value 74 and that receives the corresponding crosstalk context (e.g., the particular per-phase average weight value from the output of multiplexer circuit 84) for the compensation of the phase-specific crosstalk impacting the received pixel value 74.

As a first example, when a first pixel voltage value (e.g., pixel value 74-1 or 74-3 in FIG. 6) is received by LUT 86, phase tagging circuit 92 may provide a phase tag or other phase indicating information indicative of programming phase A (associated with the first pixel voltage value). Accordingly, multiplexer circuit 84 may select the phase A average weight value on path 81A for output to LUT 86. As a second example, when a second pixel voltage value (e.g., pixel value 74-2 or 74-4 in FIG. 6) is received by LUT 86, phase tagging circuit 92 may provide a phase tag or other phase indicating information indicative of programming phase B (associated with the second pixel voltage value). Accordingly, multiplexer circuit 84 may select the phase B average weight value on path 81B for output to LUT 86.

Based on the received pixel voltage value and the received crosstalk context (e.g., the per-phase average value indicative of the crosstalk context), LUT 86 may provide (e.g., output) a corresponding compensation value that appropriately adjusts the pixel voltage value to counteract the specific crosstalk context impacting the programming of the pixel voltage value. Accordingly, LUT 86 may sometimes be referred to as a (programming) phase-dependent compensation LUT or generally be referred to as a (programming) phase-dependent transformation or conversion circuit 86 (e.g., by transforming or mapping two input values, including a phase-dependent value, into a corresponding output value).

Because the per-phase average values are fully generated by averaging circuit 78 and obtained by multiplexer circuit 84 (e.g., using storage circuit 82) after a line time period, pixel values 74 for the line may be temporarily stored (e.g., buffered) at storage circuit 90 (e.g., a buffer) in compensation circuitry 70 for the same line time period. Thereafter, storage circuit 90 may provide the buffered pixel voltage values for the line to LUT 86 (while multiplexer 84 provides the corresponding per-phase average value to LUT 86) for mapping to an output pixel voltage compensation value.

If desired, the compensation value output from LUT 86 may be further adjusted by additional downstream compensation adjustment circuit(s) 88. These compensation adjustment circuit(s) 88 may perform any combination of adjustments such as pixel array location-based adjustments (e.g., applying a weight or scaling factor depending on the array location of the pixel to be loaded with the pixel value), general tunable adjustments (e.g., controllable by system or user input), a compensation toggle adjustment (e.g., to nullify the compensation value based on determining that compensation should not applied to the given pixel value), etc.

Compensation circuitry 70 generally apply the resulting compensation value (e.g., the compensation value directly output from LUT 86 or after further processing by adjustment circuit(s) 88)) to the corresponding pixel value for which the compensation value is generated. In the example of FIG. 7, an adder circuit 94 may receive the buffered pixel value from storage 90 (e.g., the same pixel value provided to LUT 86) and the compensation value output from LUT 86 (optionally via adjustment circuit(s) 88) and sum the values to generate the corresponding compensated pixel voltage value. The compensated pixel values may be programmed into corresponding pixels of display 24 (e.g., with or without additional downstream processing of the compensated pixel values) during respective phases on shared data lines and using corresponding gate lines (e.g., as described in connection with FIGS. 3 and 4).

Phase tagging circuits 80 and 92 may be pre-configured based on the display configuration such that their output (e.g., phase tags) align with and therefore can be used to tag or otherwise be associated with corresponding weight and/or pixel values. As shown in FIG. 7, phase tagging circuit 80 may receive loading weights (or if desired, pixel values 74) and may output different phases in temporally alignment with the transition between different loading weights. Similarly, phase tagging circuit 92 may receive pixel values from storage circuit 90 may output different phases in temporally alignment with transitions between different pixel values. If desired, phase tagging circuits 80 and/or 92 may be implemented using state machines that switch between (and output) the different phases based on a pre-determined timing according to the operation of compensation circuitry 70.

The components of compensation circuitry 70 (e.g., described in connection with FIG. 7) may be implemented in one or more integrated circuits such as microcontrollers, application-specific integrated circuits, or other types of processing circuitry with or without integrated memory, and memory or other data storage integrated circuits, may be implemented using discrete logic or other discrete components, may be implemented using one or more state machines, and/or any other suitable implementation).

The foregoing is merely illustrative and various modifications can be made to the described embodiments. The foregoing embodiments may be implemented individually or in any combination.

What is claimed is:

1. A display comprising:

first and second pixels arranged in a same row of a pixel array;

a data line coupled to the first and second pixels;

display driver circuitry coupled to the data line, configured to perform pixel value loading for the first pixel during a first programming phase using the data line, and configured to perform pixel value loading for the second pixel during a second programming phase using the data line; and a set of additional pixels in the same row of the pixel array for which pixel value loading is performed during the first programming phase, wherein the display driver circuitry includes crosstalk compensation circuitry that obtains weight values corresponding to a pixel value for the first pixel and corresponding to additional pixel values for the set of additional pixels, generates an average weight value using the weight values, and performs crosstalk compensation for the pixel value based on phase information indicative of the first programming phase and based on the average weight value.

2. The display defined in claim 1, wherein the crosstalk compensation circuitry performs crosstalk compensation for the additional pixel values for the set of additional pixels based on the phase information indicative of the first programming phase.

3. The display defined in claim 1, wherein the crosstalk compensation circuitry obtains a compensation value for the pixel value based on the average weight value and the pixel value and wherein the crosstalk compensation circuitry obtains an updated pixel value by applying the compensation value to the pixel value.

4. The display defined in claim 3, wherein the display driver circuitry performs pixel value loading for the first pixel during the first programming phase using the updated pixel value.

5. The display defined in claim 1, further comprising:

a gate line for the row of the pixel array and coupled to the first pixel and each pixel in the set of additional pixels, wherein the weight values are each indicative of a degree of capacitive loading to the gate line.

6. The display defined in claim 5, further comprising:

an additional set of additional pixels in the same row of the pixel array for which pixel value loading is performed during the second programming phase; and an additional gate line for the row of the pixel array and coupled to the second pixel and each pixel in the additional set of additional pixels.

7. The display defined in claim 6, wherein the crosstalk compensation circuitry performs crosstalk compensation for pixel values for the second pixel and for each pixel in the additional set of additional pixels based on phase information indicative of the second programming phase.

8. The display defined in claim 1, further comprising:

a third pixel arranged in a same column in the pixel array as the first pixel and coupled to the data line, wherein the display driver circuitry is configured to perform pixel value loading for the first pixel during the first programming phase in a first line time period using the data line, and wherein the display driver circuitry is configured to perform pixel value loading for the third pixel during the first programming phase in a second line time period using the data line.

9. Display pixel crosstalk compensation circuitry comprising:

a selection circuit that receives a plurality of values each based on a corresponding crosstalk context and that receives display pixel programming phase information for a pixel voltage value based on which a given value of the plurality of values is selected for output from the selection circuit; and a crosstalk compensation lookup table coupled to the selection circuit and that receives the pixel voltage value and the given value and obtains a crosstalk compensation value for the pixel voltage value based on the pixel voltage value and the given value.

10. The display pixel crosstalk compensation circuitry defined in claim 9, wherein the pixel voltage value is for a first display pixel in a given row of a pixel array, and wherein the first display pixel shares a data line with at least a second display pixel in the given row.

11. The display pixel crosstalk compensation circuitry defined in claim 10, wherein the selection circuit selects an additional given value of the plurality of values based on pixel programming phase information for an additional pixel voltage value to be loaded into the second display pixel, and wherein the crosstalk compensation lookup table receives the additional pixel voltage value and the additional given value and obtains a crosstalk compensation value for the additional pixel voltage value based on the additional pixel voltage value and the additional given value.

12. The display pixel crosstalk compensation circuitry defined in claim 9, wherein the pixel voltage value is for a first display pixel in a given row of a pixel array and coupled to a first data line, wherein the given row includes at least a second display pixel coupled to a second data line, and wherein the first and second display pixels are loaded with pixels values during a same pixel programming phase.

13. The display pixel crosstalk compensation circuitry defined in claim 12, wherein the selection circuit selects the given value based on pixel programming phase information for an additional pixel voltage value to be loaded into the second display pixel and wherein the crosstalk compensation lookup table receives the additional pixel voltage value and the given value and obtains a crosstalk compensation value for the additional pixel voltage value based on the additional pixel voltage value and the given value.

14. The display pixel crosstalk compensation circuitry defined in claim 9, wherein the plurality of values are each an average gate line loading weight value associated with a different subset of pixel values to be loaded into a same pixel row of a pixel array.

15. The display pixel crosstalk compensation circuitry defined in claim 14, wherein the average gate line loading weight values are each indicative of a capacitive loading to a different gate line for the same pixel row.

16. A display comprising:

a pixel array having first and second pixels in a same row of the pixel array;

a data line shared by the first and second pixels; and crosstalk compensation circuitry coupled to the data line and configured to receive a pixel value to be loaded into the first pixel and perform crosstalk compensation for the pixel value by associating the pixel value with a tag indicative of a pixel programming phase in which pixel value loading occurs for the first pixel, obtaining a crosstalk compensation value for the pixel value based on the tag, and obtaining an updated pixel value to be loaded into the first pixel based on the crosstalk compensation value and the pixel value.

17. The display defined in claim 16, wherein the crosstalk compensation circuitry is configured to perform crosstalk compensation for the pixel value by selecting, using the tag, a gate line capacitive loading value based on which the crosstalk compensation value is obtained.

18. The display defined in claim 17, wherein the gate line capacitive loading value comprises an average weight value for a group of pixels in the row of the pixel array.

19. The display defined in claim 16, wherein the crosstalk compensation circuitry is configured to receive an additional pixel value to be loaded into the second pixel and perform crosstalk compensation for the additional pixel value by associating the additional pixel value with an additional tag indicative of an additional pixel programming phase in which pixel value loading occurs for the second pixel, obtaining an additional crosstalk compensation value for the additional pixel value based on the additional tag, and obtaining an updated additional pixel value to be loaded into the second pixel based on the additional crosstalk compensation value and the additional pixel value.

20. The display defined in claim 16, further comprising:

an additional data line, wherein the pixel array has a third pixel in the row of the pixel array, wherein the third pixel is coupled to the additional data line, wherein pixel value loading for the third pixel occurs in the pixel programming phase, and wherein the crosstalk compensation circuitry is configured to receive an additional pixel value to be loaded into the third pixel and perform crosstalk compensation for the additional pixel value by associating the additional pixel value with the tag indicative of the pixel programming phase in which pixel value loading occurs for the third pixel, obtaining an additional crosstalk compensation value for the additional pixel value based on the tag, and obtaining an updated additional pixel value to be loaded into the third pixel based on the additional crosstalk compensation value and the additional pixel value.

* * * * *